United States Patent [19]

Boden

[11] 3,953,144

[45] Apr. 27, 1976

[54] CORD LOCK WITH BOTH SHARP AND DULL TEETH

[76] Inventor: Ogden W. Boden, 1580 Gaywood Drive, Altadena, Calif. 91001

[22] Filed: Oct. 17, 1974

[21] Appl. No.: 515,465

Related U.S. Application Data

[63] Continuation-in-part of Ser. No. 439,422, Feb. 4, 1974, abandoned.

[52] U.S. Cl. .................... 403/374; 403/211; 24/115 M; 24/136 R

[51] Int. Cl. .................... F16g 11/04

[58] Field of Search ......... 24/115 M, 136 R, 136 K; 403/374, 211; 285/259

[56] References Cited

UNITED STATES PATENTS

| | | | |
|---|---|---|---|
| 545,760 | 9/1895 | Ashley | 24/136 R |
| 1,872,047 | 8/1932 | Templin | 24/263 B |
| 2,177,364 | 10/1939 | Fotsch | 24/81 PE |
| 2,945,563 | 7/1960 | O'Hara | 24/136 R |
| 3,132,390 | 5/1964 | Boden | 24/136 R |
| 3,137,027 | 6/1964 | Birkle | 24/260 |
| 3,796,504 | 3/1974 | Marechal | 403/288 |

FOREIGN PATENTS OR APPLICATIONS

| | | | |
|---|---|---|---|
| 208,803 | 5/1940 | Switzerland | 24/136 R |

*Primary Examiner*—Bernard A. Gelak
*Attorney, Agent, or Firm*—William P. Green

[57] ABSTRACT

A cord locking device including a body carrying a movable slide element having two sets of teeth at its opposite sides for releaseably gripping a pair of cords to lock them against movement in a predetermined direction, with each set of teeth including a first tooth which is relatively sharp and therefore capable of readily locally deforming a surface of the cord in a manner maximizing the tendency for automatic self locking displacement of the slide element by the cord upon longitudinal movement thereof, and including a second tooth which is less sharp and acts to take longitudinal forces exerted by the engaged cord in the ultimate locking condition in a manner protecting the sharper tooth against deformation and damage.

10 Claims, 7 Drawing Figures

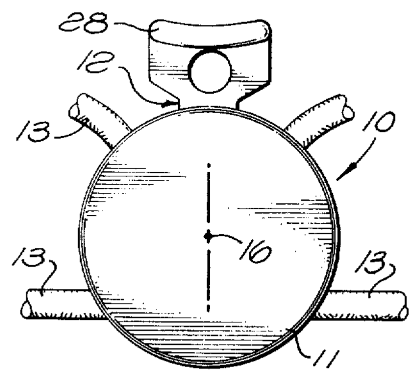
FIG. 1.
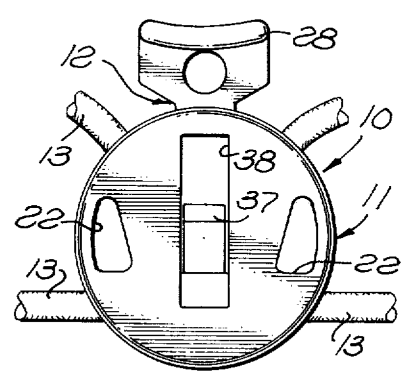
FIG. 2.
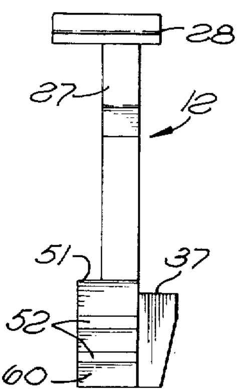
FIG. 4.
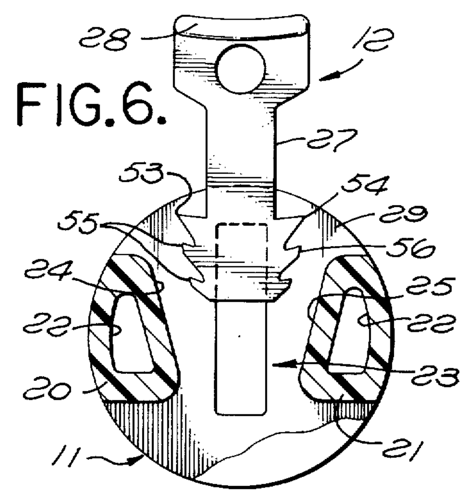
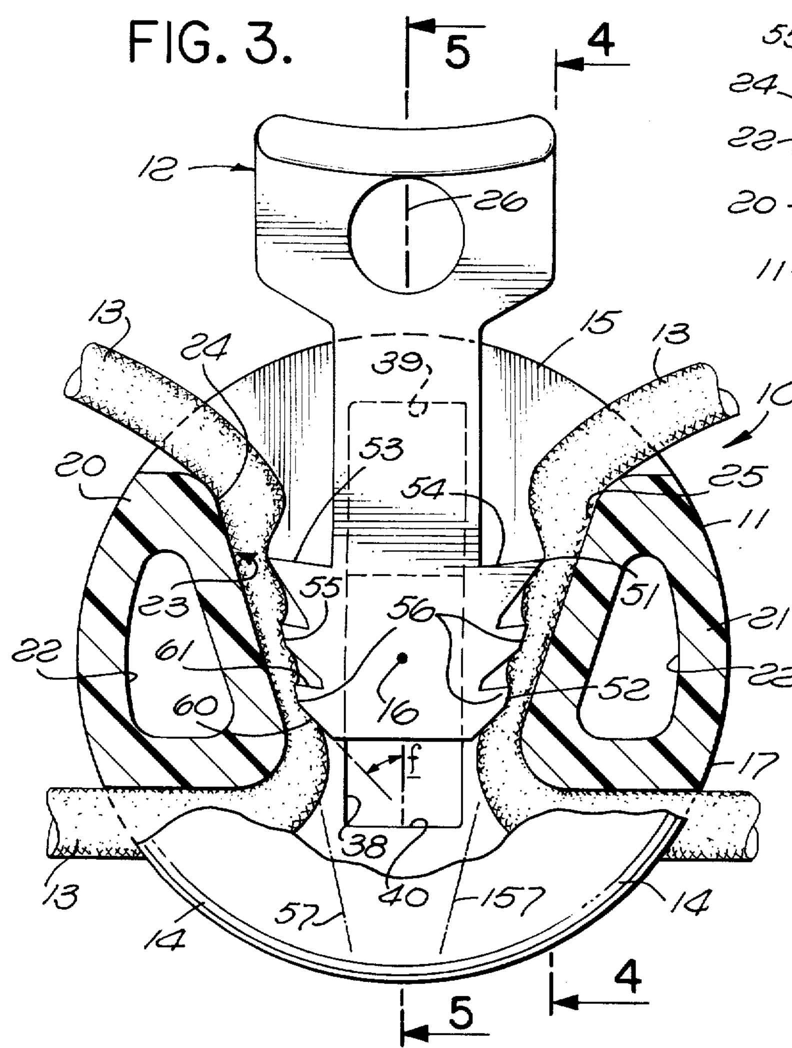
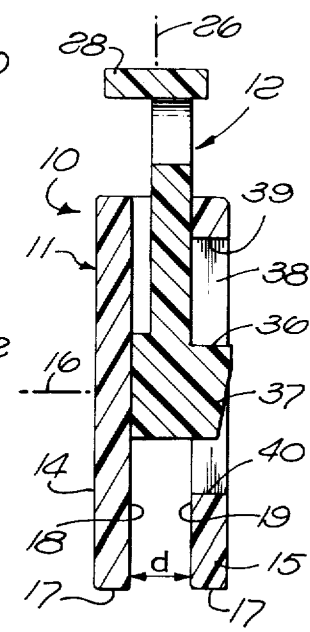
FIG. 5.

CORD LOCK WITH BOTH SHARP AND DULL TEETH

CROSS-REFERENCE TO RELATED APPLICATION

The present application is a continuation-in-part of my copending application Ser. No. 439,422 filed Feb. 4, 1974, now abandoned.

BACKGROUND OF THE INVENTION

This invention relates to improved devices for locking a pair of flexible cords against longitudinal movement, as for instance in a drawstring arrangement for a garment, bag, or the like.

There have in the past been devised cord locking devices of a type including a body having a passage through which a pair of cords extend, and containing a slide element having two sets of teeth at its opposite sides and mounted for movement relative to the body between a position for locking the cords against axial movement and a released position. One such device is shown in my prior U.S. Pat. No. 3,132,390 issued May 12, 1964 on "Slide Clamp". In such devices, I have found it desirable to utilize relatively sharp gripping teeth on the slide element for engaging the cord or cords in a relation easily locally deforming the surface of a cord and thereby very readily effecting automatic locking displacement of the slide element by the cord itself upon longitudinal movement thereof. However, if the teeth are made sharp for this purpose, their extremities become so thin as to themselves be too easily deformable upon exertion of longitudinal force against the cord in the locking condition, with a resultant tendency for damage to or destruction of the teeth if excessive forces are applied to the cord.

SUMMARY OF THE INVENTION

The present invention is directed particularly to the provision of an improved tooth arrangement which effectively maximizes the desired self locking action of a device of the above discussed general type, and yet which at the same time avoids the undesirable tendency heretofore encountered for distortion or destruction of the teeth. In particular, this result is achieved by providing the slide element at each of its opposite sides with teeth of two different types, including a first tooth which is relatively sharp and adapted to grip a cord and be displaced thereby very readily for automatically locking the device upon movement of the cords in a locking direction, and including also a second tooth which is less sharp than the first mentioned tooth. These second less sharp teeth, while not having as great a tendency to effect automatic displacement of the slide in response to longitudinal movement of the cords, do have a greater strength than the sharper automatic setting teeth, and as a result of that increased strength can take greater forces exerted by the cords, and thereby effectively prevent longitudinal movement of the cords under excessive forces which would damage or destroy the teeth if only the sharper type teeth were employed. Each of the teeth is desirably of essentially ratchet-shaped configuration, having a leading face which is disposed at an oblique angle with respect to the axis of movement of the slide element, and having a trailing face which is disposed more directly transversely with respect to that axis. The two sets of teeth formed at the opposite sides of the slide element clamp the cords outwardly against two opposed convergings walls of the discussed passage through the body of the device.

BRIEF DESCRIPTION OF THE DRAWINGS

The above and other features and objects of the invention will be better understood from the following detailed description of the typical embodiments illustrated in the accompanying drawings, in which:

FIG. 1 is a front elevational view of a cord locking device embodying the invention;

FIG. 2 is a rear view of the FIG. 1 device;

FIG. 3 is an enlarged section through the unit of FIG. 1;

FIG. 4 is a side view of the slide element of FIG. 3, taken essentially on line 4—4 of FIG. 3;

FIG. 5 is a reduced axial section taken on line 5—5 of FIG. 3;

FIG. 6 is a view similar to FIG. 3, but showing the device in its released condition.

DESCRIPTION OF THE PREFERRED EMBODIMENTS

Figure 7:
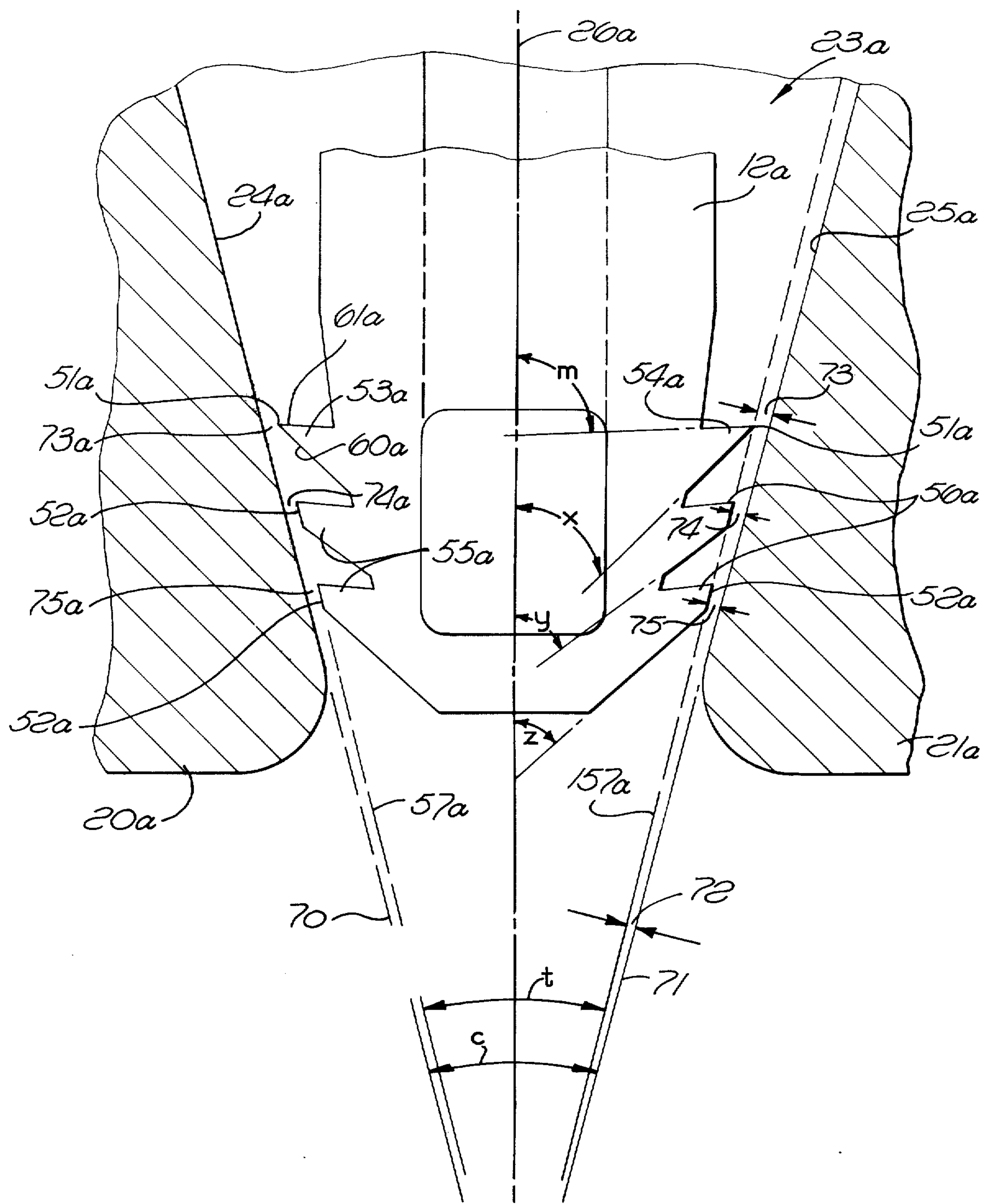
FIG. 7 is a greatly enlarged fragmentary view similar to a portion of FIG. 3 but showing a variational form of the invention.

FIGS. 1 to 6 show a cord locking device 10, embodying the invention, which is capable of simultaneously locking two flexible cords 13 against longitudinal movement. These two cords may in some instances be entirely separate elements, or in other instances be formed as the opposite ends of a single drawstring of a garment or the like. Consequently, where this description of the appended claims refer to "two cords", this term is to be read as including an arrangement in which the two cords are in fact different portions of a single cord.

The locking device 10 of FIGS. 1 to 6 includes a body 11 having parallel essentially planar and typically circular front and rear walls 14 and 15 interconnected by spaced camming portions 20 and 21 having planar downwardly converging wall surfaces 24 and 25 defining opposite sides of a downwardly tapering throat or passage 23. Surfaces 24 and 25 are symmetrical with respect to an axis 26 along which a locking slide element 12 is movable between the locking position of FIG. 3 and the released position of FIG. 6.

The two parts 11 and 12 are preferably formed of a resinous plastic material, such as polyethylene or polypropylene molded to the desired shapes, which material is essentially stiff or rigid and only slightly resiliently deformable.

The two similar circular front and rear walls 14 and 15 of body 11 are disposed transversely of a main central axis 16 of the device, with the circular peripheral edges 17 of these walls being centered about that axis. The opposed inner planar surfaces 18 and 19 of walls 14 and 15 are disposed parallel to one another, and spaced apart the distance *d* of FIG. 5, with the two laterally spaced portions 20 and 21 of the body 11 extending between the two walls. These two portions 20 and 21 may have the cross-section represented in FIG. 3 through their entire extent from surface 18 to surface 19. As represented in that figure, each of the portions 20 and 21 may if desired be made hollow, to lighten the device, by provision of recesses 22 extending into the interior of these portions 20 and 21 from the back side of the body.

Portions 20 and 21 of body 11 define with the surfaces 18 and 19 of walls 14 and 15 the previously mentioned tapering throat 23 within which slide 12 is movably received. The axis 26 of movement of slide 12 relative to body 10 intersects and is perpendicular to the previously mentioned main axis 16 of the body.

Slide 12 has a cord locking or gripping portion 29 located within passage 23 and having at its opposite sides two oppositely facing series of teeth including two sharp teeth 53 and 54 and two pairs of less sharp teeth 55 and 56. Each of these teeth may be of essentially ratchet shaped cross section, having a leading face 60 which is disposed at an oblique angle with respect to axis 26, and a trailing face 61 which is disposed more directly transversely or perpendicular with respect to axis 26. These leading and trailing faces of the two upper teeth 53 and 54 intersect at sharp edges 51, while the less sharp teeth 55 and 56 may have outer planar flats 52, preferably lying in two planes 57 and 157 which are parallel to surfaces 24 and 25 respectively and desirably contain the outer sharp edges 51 of teeth 53 and 54 respectively. The two cords 13 are clamped tightly between the two discussed sets of teeth and body surfaces 24 and 25, to lock the cords against downward movement as viewed in FIG. 3. Slide 12 has a portion 27 which projects outwardly beyond the periphery of body 11, and has a handle flange or portion 28 by which the slide many be actuated manually between its FIG. 3 and FIG. 6 positions. A preferably square lug 37 at the back side of slide 12 is receivable and movable within an elongated slot 38 formed in the back wall 15 of body 11, to guide the slide for only axial movement along axis 26, and to limit that movement in the FIG. 6 retracted position by engagement with shoulder 39 at the end of the slot. Movement of the slide in a locking direction (downwardly in FIG. 3) is limited by engagement of lug 37 with a second shoulder 40 at a opposite end of the slot, and in a position somewhat beyond the FIG. 3 position (to which position the slide can not move when the cords are present in the device).

The teeth 53, 54, 55 and 56 are desirably of a thicknss to occupy substantially the entire distance between the two parallel wall surfaces 18 and 19 of body 11 (FIG. 5). More particularly, the teeth may have planar surfaces 49 and 50 received closely adjacent to and slidably contacting body surfaces 18 and 19 respectively. The teeth desirably are of uniform cross-section throughout the entire thickness thereof, between surfaces 49 and 50, with that cross-section being as illustrated in FIGS. 3 and 6.

It is contemplated that the particular number of sharp and blunt teeth at each side of element 12 in some instances may be different than that shown in FIGS. 3 and 6, so long as at least one sharp tooth and one blunt tooth are provided in each set. In most cases, however, a single sharp tooth and a plurality of blunt teeth (optimally two) at each side are preferred.

In using the device of FIGS. 1 to 6, the two cords may be slipped through passage 23 at opposite sides of the slide, and may be adjusted to any desired set position so long as slide 12 is held in the FIG. 6 retracted position. If the slide is then released, and the cords are pulled downwardly as viewed in FIGS. 3 and 6, the sharp teeth 53 and 54 by virtue of their very localized engagement with the cords act to cause downward shifting movement of the slide with the cords toward the FIG. 3 locked position. In that locked condition, the blunt teeth 55 engage the cords to take the major portion of the longitudinal forces exerted by the cords, to thereby very positively retain the cords against downward movement relative to the cord locking device but without allowing the exertion of excessive forces against the small dimension sharp tip portions 51 of teeth 53 and 54. Thus, the sharp teeth attain an effective self locking or self setting action, while the less sharp teeth take most of the forces and prevent damage to the sharper teeth in the locked condition.

FIG. 7 shows fragmentarily a variational form of the invention, which may be considered as identical with the above discussed arrangement of FIGS. 1 to 6 except with regard to the features specifically discussed hereinbelow. The device of FIG. 7 includes a slide 12*a* similar to slide 12 of FIGS. 1 to 6 and mounted for movement in opposite directions along an axis 26*a* relative to a body such as that shown at 11 in FIG. 1. This body has two portions 20*a* and 21*a* corresponding to portions 20 and 21 of the first form of the invention, and presenting two opposed converging planar surfaces 24*a* and 25*a* (corresponding to surfaces 24 and 25 of FIG. 3) to form a tapering throat or passageway 23*a*. As in FIG. 3, two cords extend along opposite sides of the slide, between its two sets of teeth and the opposed surfaces 24*a* and 25*a*. These cords have been omitted from the showing of FIG. 7 in order to facilitate an understanding of the angularity of the teeth as compared with that of surfaces 24 *a* and 25*a*.

The two sets of teeth include a first pair of sharp teeth 53*a* and 54*a*, whose leading and trailing faces 60*a* and 61*a* converge outwardly to sharp edges 51*a*. The blunt teeth 55*a* and 56*a*, on the other hand, have flat outer crescent surfaces 52*a*, lying in two converging planes 57*a* and 157*a*, which also contain the two sharp edges 51*a* of the two sharp teeth 53*a* and 54*a* respectively. In contra-distinction to the arrangement of FIGS. 1 to 6, these planes of the tooth crests in FIG. 7 are not precisely parallel to, and disposed at exactly the same angle as, the planes 70 and 71 of converging body surfaces 24*a* and 25*a*. Instead, in FIG. 7 the teeth are preferably so formed that the two planes 57*a* and 157*a* diverge very slightly away from surfaces 24*a* and 25*a* respectively as they advance upwardly in FIG. 7. That slight diverging angularity is represented at 72 in FIG. 7. As a result of this angularity at 72, the sharp edge 51*a* of tooth 54*a* is, in any particular position of locking element 12*a*, spaced farther from the opposed caming surface 25*a* of the body than are the flat crests 52*a* of the two blunt teeth 56*a* at the same side of element 12*a*. That is, in the FIG. 7 setting of element 12*a*, the minimum distance 73 from sharp edge 51*a* of tooth 54*a* to surface 25*a* is slightly greater than the corresponding minimum distance 74 between a first of the blunt teeth 56*a* and surface 25*a*, and the still slightly smaller distance 75 between the second of the blunt teeth and surface 25*a*. The same relationship is true as to the corresponding distances 73*a*, 74*a* and 75*a* at the opposite side of element 12*a*. Also, this same relationship remains true as element 12*a* is shifted upwardly relative to the body from the particular position illustrated in FIG. 7, though the actual distances between the teeth and surfaces 24*a* and 25*a* of course increase as element 12*a* moves upwardly. The particular position shown in FIG. 7 may be the lowermost position to which element 12*a* can move when no cords are present in the device. When cords are present, they will of course prevent movement of element 12*a* downwardly as far as in FIG.

7. However, the FIG. 7 lowermost position has been chosen for illustration in order to best bring out the discussed slight angular divergence between the teeth and surfaces 24*a* and 25*a*.

To define the preferred angularity 72 more precisely, it is desirable that each of the angles 72 be greater than zero but not more than about 5 degrees, optimally between about ½ of a degree and 2°. It is preferred that the included angle *c* between the two planes 70 and 71 of cam surfaces 24*a* and 25*a* be between about 21° and 34°; and that the included angle *t* between tooth crest planes 57 and 157*a* be between about 23° and 32°. It is also preferred in FIG. 7 that the angles *x*, *y* and *z* between the leading faces 60*a* of the three teeth of each set of teeth and axis 26*a* be in most instances between about 30° and 50°, with the angles *x* and *z* desirably being about 45° and greater than the angle *y*, which is preferably about 37°. The angle *m* between each of the trailing faces 61*a* of the various teeth and axis 26*a* should for best operation be between about 80° and 95°.

The invention in its broadest aspects of course does not require the specific angularities or other shape characteristics shown in the presently preferred arrangement of FIG. 7, though these structural features are desirable in what is currently felt to be the optimum arrangement.

In using the device of FIG. 7, the locking and releasing operations are performed in the same manner as discussed in detail in connection with FIGS. 1 to 6. The slightly increased spacing of sharp teeth 53*a* and 54*a* from cam surfaces 24*a* and 25*a*, as compared with the slightly reduced spacing of the blunt teeth from the same cam surfaces, affords increased protection against damage to or destruction of the sharp teeth by the high forces exerted against the cords in the locked condition of the device. The sharp teeth in FIG. 7 project outwardly far enough to very effectively contact the cords during an initial portion of the movement of element 12*a* in a locking direction relative to the body, and thereby attain the previously discussed self-locking displacement of element 12*a* by the cords, and yet the slightly inwardly offset positions of the sharp teeth as represened by the angularity 72 of FIG. 7 reduces the exposure of the sharp teeth to the high cord forces in the ultimate fully locked condition, and assures that the blunt teeth will take those forces without damage to the sharp teeth.

While certain specific embodiments of the present invention have been disclosed as typical, the invention is of course not limited to these particular forms, but rather is applicable broadly to all such variations as fall within the scope of the appended claims.

I claim:

1. A cord locking device comprising:

a body containing a tapering passage through which two flexible cords are to extend and which is defined at opposite sides by two cam surfaces facing one another and converging toward one another as they advance in a predetermined direction; and a slide element having a portion received within said passage and between said converging cam surfaces, and having two sets of teeth at opposite sides of said element facing in opposite directions toward said two cam surfaces respectively to define therewith two spaces along which said two cords extend and within which they are clamped between said teeth and said cam surfaces in a relation locking said cords against movement in said predetermined direction;

said element being movable along an axis in said predetermined direction relative to said body to grip the cords, and being movable in an opposite retracting direction along said axis to release the cords;

each of said sets of teeth including a first relatively sharp tooth having leading and trailing faces converging to a substantially sharp outer edge near a corresponding one of said cam surfaces, and including a relatively blunt tooth with leading and trailing faces and an outer crest surface which faces toward said corresponding cam surface but is less sharp than said edge of the first tooth; said sharp edge and said blunt outer surface of the teeth of one of said sets of teeth having outermost portions lying essentially in a first plane which converges toward said axis and is approximately parallel to the corresponding one of said cam surfaces; and said sharp edge and said blunt outer surface of the teeth of the other set of teeth having outermost portions lying essentially in a second plane which converges toward said axis and toward said first plane and is approximately parallel to the other of said cam surfaces.

2. A cord locking device as recited in claim 1, in which said relatively sharp tooth of each set of teeth is essentially ratchet-shaped having its leading face disposed at an oblique angle to said axis and its trailing face disposed more directly transversely of said axis.

3. A cord locking device as recited in claim 1, in which both said relatively sharp teeth and said relatively blunt teeth of the two sets of teeth are ratchet-shaped, having leading faces disposed at an oblique angle to said axis and trailing faces disposed more directly transversely of said axis.

4. A cord locking device as recited in claim 1, in which each of said sets of teeth includes only one of said relatively sharp teeth and two of said relatively blunt teeth all having outermost portions lying essentially in a corresponding one of said first or second planes.

5. A cord locking device as recited in claim 1, in which said outer crest surfaces are substantially planar and substantially parallel to said cam surfaces.

6. A cord locking device as recited in claim 1, in which each of said first and second planes is disposed at an angle to said axis which is slightly less than the angle of the corresonding one of said cam surfaces to the axis, in a relation locating said sharp edge of each of said relatively sharp teeth slightly farther away from the corresponding cam surface than is the blunt outer surface of an associated one of said relatively blunt teeth.

7. A cord locking device as recited in claim 1, in which each of said first and second planes is disposed at an angle to said axis which is less than the angle of the corresponding one of said cam surfaces to the axis, but not by more than about 5°, in a relation locating said sharp edge of each of said relatively sharp teeth slightly farther from the corresponding cam surface than is the blunt outer surface of an associated one of said blunt teeth.

8. A cord locking device as recited in claim 1, in which said slide element has a handle portion projecting outwardly beyond said body and accessible for manual actuation of the element.

9. A cord locking device as recited in claim 1, in which said slide element has a lug projecting into and slidable within an elongated slot in said body to limit the axial movement thereof.

10. A cord locking device as recited in claim 1, in which each of said sets of teeth includes two of said relatively blunt teeth whose outer crest surfaces are substantially planar and both lie in the same one of said first or second planes and essentially parallel to a corresponding one of said cam surfaces; said sharp and blunt teeth of both sets of teeth all being essentially ratchet-shaped and having leading faces disposed at an oblique angle to said axis and trailing faces disposed more directly transversely of said axis; each of said first and second planes being disposed at an angle to said axis which is slightly less than the angle of the corresponding one of said cam surfaces to the axis in a relation locating said sharp edge of each of said relatively sharp teeth slightly farther away from the corresponding cam surface than is the blunt outer surface of an associated one of said relatively blunt teeth; said slide element having a handle portion projecting outwardly beyond said body, and a lug projecting into and slidable axially within a slot in a wall of said body.

* * * * *